(12) United States Patent
Martin

(10) Patent No.: US 10,066,079 B2
(45) Date of Patent: Sep. 4, 2018

(54) HYDROGEN SULFIDE SCAVENGER

(71) Applicant: Innophos, Inc., Cranbury, NJ (US)

(72) Inventor: Jean Valery Martin, Princeton, NJ (US)

(73) Assignee: Innophos, Inc., Cranbury, NJ (US)

( * ) Notice: Subject to any disclaimer, the term of this patent is extended or adjusted under 35 U.S.C. 154(b) by 0 days.

(21) Appl. No.: 15/115,672

(22) PCT Filed: Jan. 29, 2015

(86) PCT No.: PCT/US2015/013612
§ 371 (c)(1),
(2) Date: Jul. 31, 2016

(87) PCT Pub. No.: WO2015/116864
PCT Pub. Date: Aug. 6, 2015

(65) Prior Publication Data
US 2017/0306129 A1 Oct. 26, 2017

Related U.S. Application Data

(63) Continuation of application No. 14/222,436, filed on Mar. 21, 2014, now Pat. No. 9,783,458, which is a continuation-in-part of application No. 14/170,224, filed on Jan. 31, 2014, now Pat. No. 9,441,092.

(51) Int. Cl.
| | | |
|---|---|---|
| *C04B 24/40* | (2006.01) | |
| *C04B 26/26* | (2006.01) | |
| *C08K 5/00* | (2006.01) | |
| *C08K 5/17* | (2006.01) | |
| *C08L 95/00* | (2006.01) | |

(52) U.S. Cl.
CPC ............ *C08K 5/175* (2013.01); *C08K 5/0008* (2013.01); *C08K 5/0091* (2013.01); *C08L 95/00* (2013.01)

(58) Field of Classification Search
None
See application file for complete search history.

*Primary Examiner* — Colin W. Slifka
(74) *Attorney, Agent, or Firm* — David LeCroy

(57) ABSTRACT

The present disclosure is related to a family of metals chelates for use as a hydrogen sulfide scavenger in asphalt, and the preparation thereof. The metal chelates, in particular amino acid metal chelates, are particularly efficient at reducing the hydrogen sulfide emissions of asphalt.

5 Claims, No Drawings

HYDROGEN SULFIDE SCAVENGER

CROSS REFERENCE TO RELATED APPLICATIONS

The present application is a 371 National stage entry of International Application No. PCT/US2015/013612 filed Jan. 29, 2015, which claims priority to U.S. Pat. No. 9,783,458, which claims priority to and is a continuation-in-part of U.S. Pat. No. 9,441,092, the entire contents of which are hereby incorporated by reference.

FIELD OF THE INVENTION

The present disclosure relates to a hydrogen sulfide scavenger for use as an additive in asphalt.

BACKGROUND OF THE INVENTION

Asphalt is commonly used in the construction and paving of roads. Asphalt is a mixture of aggregate material, such as sand, gravel, and crushed stone, with hot bitumen. The bitumen coats the aggregate material to give the asphalt, which may be spread as a uniform layer upon a road bed and compacted and smoothed with heavy rolling equipment.

Asphalt invariably contains sulfur. The amount of sulfur will depend on the origin of the crude oil, as well as the processes used to refine the crude oil, into asphalt. The sulfur may exist in different forms. For example, sulfur may be in the form of hydrogen sulfide. Hydrogen sulfide, or dihydrogen sulfide, is a chemical compound with the formula $H_2S$. It is a colorless, poisonous, flammable gas with the characteristic foul odor.

Hydrogen sulfide may be released form asphalt, in particular when the asphalt is heated to a certain temperature. For example, hydrogen sulfide results from the dehydrogenation reactions that occur between bitumen and sulfur at the hot mixing temperatures, e.g. temperatures greater than 140° C. Hydrogen sulfide emissions are regulated. Therefore, there exists a need to reduce the amount of hydrogen sulfide in asphalt. Accordingly, the present disclosure provides for a reduced or low release of hydrogen sulfide during the preparation of asphalt, as well as in the final asphalt material.

SUMMARY OF THE INVENTION

The present invention is directed to compositions and methods for reducing hydrogen sulfide emission from a composition by combining a compound which will act as a scavenger for hydrogen sulfide when emitted from the composition.

DETAILED DESCRIPTION OF THE INVENTION

The present disclosure is related to a family of metals chelates for use as a hydrogen sulfide scavenger in asphalt, and the preparation thereof. The metal chelates, in particular amino acid metal chelates, are particularly efficient at reducing the hydrogen sulfide emissions of asphalt.

The present disclosure is directed to a composition comprising asphalt and an amino acid metal chelate. In some embodiments, the amino acid metal chelate is selected from the group consisting of copper bis-glycinate, zinc bis-glycinate and mixtures thereof.

The present disclosure is also directed to a method of reducing hydrogen sulfide emission from asphalt, or the preparation thereof, comprising the step of combining an amino acid metal chelate to asphalt, or an asphalt mix. In some embodiments, the amino acid metal chelate is selected from the group consisting of copper bis-glycinate, zinc bis-glycinate and mixtures thereof.

The amino acid metal chelate may also be selected form the following: Boron Amino Acid Chelate; Boron Aspartate; Boron Citrate; Boron Glycinate; Calcium Alphaketoglutarate; Calcium Amino Acid Chelate; Calcium Arginate; Calcium Ascorbate; Calcium Aspartate; Calcium Caprylate; Calcium Carbonate; Calcium Citrate Malate; Calcium Glycinate; Calcium D-Glucarate; Calcium Krebs Cycle; Calcium Lactate; Calcium Malate; Calcium Orotate; Calcium Succinate; Chromium Amino Acid Chelate; Chromium Arginate; Chromium Chloride; Chromium Dinicotinate/Glycinate; Chromium Picolinate; Chromium Nicotinate; Chromium Trit; Chromium Yeast; Chromium Nicotinate/Glycinate; Copper Amino Acid Chelate; Copper Aspartate; Copper Carbonate; Copper Citrate; Copper Gluconate; Copper Glycinate; Copper Sulfate; Copper Yeast; Iron Amino Acid Chelate; Iron Aspartate; Iron Bis-Glycinate HCl Soluble; Iron Citrate; Iron Fumarate; Iron Gluconate; Iron Glycinate; Iron Sulfate; Iron Yeast; Lithium Aspartate; Lithium Orotate; Magnesium Alphaketoglutarate; Magnesium Amino Acid Chelate; Magnesium Ascorbate; Magnesium Aspartate; Magnesium Citrate; Magnesium Gluconate; Magnesium Glycinate; Magnesium Malate; Magnesium Orotate; Magnesium Oxide; Magnesium Succinate; Magnesium Taurinate; Magnesium Yeast; Manganese Amino Acid Chelate; Manganese Aspartate; Manganese Carbonate; Manganese Citrate; Manganese Gluconate; Mananese Glycinate; Manganese Sulfate; Manganese Yeast; Molybdenum Amino Acid Chelate; Molybdenum Trit; Molybdenum Yeast; Sodium Molybdate; Phosphorus Amino Acid Chelate; Dicalcium Phosphate; Potassium Amino Acid Chelate; Potassium Ascorbate; Potassium Aspartate; Potassium Citrate; Potassium Chloride; Potassium D-Glucarate; Potassium Gluconate; Potassium Glycerophosphate; Potassium Iodide Trit; Potassium Succinate; Selenium Amino Acid Chelate; Selenium Aspartate; L-Selenomethionine; Selenium Yeast; Sodium Selenate; Sodium Selenite; Strontium Aspartate; Strontium Citrate; Strontium Glycinate; Vanadium Amino Acid Chelate; Vanadium Citrate; Bis-Maltolato Oxo Vanadium; Vanadyl Sulfate; Sodium Metavanadate; Zinc Acetate; Zinc Arginate; Zinc Amino Acid Chelate; Zinc Ascorbate; Zinc Aspartate; Zinc Gluconate; Zinc Glycinate; Zinc Methionate; Zinc Oxide; Zinc Picolinate; Zinc Sulfate; and Zinc Yeast and mixtures thereof.

Said amino acid metal chelates can be added to the asphalt as a liquid (e.g a solvent), solid, powder, slurry, gel, or emulsion.

Applicant has discovered that when a solid amino acid metal chelate $H_2S$ scavenger is dispersed in a solvent such as glycerol, kerosene, naphta, aliphatic, aromatic or naphthenic oil or any solvent with a flash point compatible with asphalt or bitumen, said solvent dispersion will provide similar performance to the solid form of said scavenger in the presence or not of polyphosphoric acid or other typical additives used in asphalt. In addition the liquid scavenger is stable overtime in normal storage conditions.

The preparation of the liquid scavenger follow typically the steps below:

The solvent is maintain at room temperature or heated up to a temperature below the flash point of the considered solvent Some suspension stabilizers, thinner or thickener agent could be used to improve the stability of the mixture The addition of the solid scavenger under agitation typically for 15 minutes to 10 hours. The concentration of the solid scavenger varies according to the workability of the mixture, and typically could range from 5% wt to 90% and most typically from 20 to 60% wt.

The rate of addition into the asphalt or bitumen is proportional to its solid content and varies from 0.05 to 5%, preferably from 0.9 to 0.5% wt.

The following example illustrates the neutral impact in terms of performance grading of the addition of the liquid form of the scavenger into asphalt.

| Sample | ODSR (°C) |
|---|---|
| Neat Bitumen A 58-28 | 58.0 |
| Neat A +1% polyphosphoric acid-Control | 65.6 |
| Neat A+0.2% Liquid Scavenger +1% PPA | 65.4 |
| Neat A+0.2% Liquid Scavenger +1% PPA | 64.8 |
| Neat Bitumen B 58-28 | 58.7 |
| Neat B+1% PPA -Control | 66.0 |
| Neat B+0.2% Liquid Scavenger +1% PPA | 65.8 |
| Neat B+0.2% Liquid Scavenger +1% PPA | 65.6 |
| Neat Bitumen C 58-28 | 59.8 |
| Neat C+1% PPA -Control | 67.0 |
| Neat C+0.2% Liquid Scavenger +1% PPA | 66.4 |
| Neat C+0.2% Liquid Scavenger +1% PPA | 66.5 |

Original Dynamic Shear Rheometer (ODSR).

EXAMPLES

Example 1

Hydrogen sulfide emissions were measured from asphalt samples containing an amino acid metal chelate versus a control containing no amino acid metal chelate. Three asphalt samples were prepared and their hydrogen sulfide emissions measured after 1 hour in storage. To two samples, 0.5% amino acid metal chelate additive was added, CuGlyc (copper bis-glycinate) and ZnGlyc (zinc bis-glycinate) respectively. The hydrogen sulfide emissions were measured again after 5 minutes and 1 hour. Table 1 lists the results. The addition of the amino acid metal chelate showed significant reduction in hydrogen sulfide emissions.

TABLE 1

Hydrogen Sulfide Emission

| %Additive | | Temp | $H_2S$ (ppm) Storage at 160, one hour | $H_2S$ (ppm) 5 minutes after addition of scavenger | $H_2S$ (ppm) 1 hour after adding scavenger material |
|---|---|---|---|---|---|
| 0 | Control | 180° C. | 16 | | 10 |
| 0.5 | CuGlyc | 180° C. | 12 | 4 | 1 |
| 0.5 | ZnGlyc | 180° C. | 10 | 5 | 1 |

Example 2

Additional amino acid metal chelates that may be used in asphalt, or the preparation thereof, are listed in Table 2.

TABLE 2

Amino Acid Metal Chelates

| Metal | Chelating agent |
|---|---|
| Chromium | Amino Acid |
| | Arginate Chloride |
| | Dinicotinate/Glycinate |
| | Picolinate |
| | Nicotinate |
| | TritChromium Yeast |
| Copper | Amino Acid |
| | Aspartate |
| | Carbonate |
| | Citrate |
| | Gluconate |
| | Sulfate |
| | Yeast |
| Iron | Amino Acid |
| | Aspartate |
| | Bis-Glycinate |
| | Citrate |
| | Fumarate |
| | Gluconate |
| | Sulfate |
| | Yeast |
| Manganese | Amino Acid |
| | Aspartate |
| | Carbonate |
| | Citrate |
| | Gluconate |
| | Sulfate |
| | Yeast |
| Molybdenum | Amino Acid |
| | TritMolybdenum |
| | Yeast |
| | Sodium Molybdate |
| Selenium | Amino Acid |
| | Aspartate |
| | L-Selenomethionine |
| | Yeast |
| | Sodium Selenate |
| | Sodium Selenite |
| Strontium | Aspartate |
| | Citrate |
| | Glycinate |
| Vanadium | Amino Acid |
| | Citrate |
| | Bis-Maltolato Oxo Vanadium |
| | Vanadyl Sulfate |
| | Sodium Metavanadate |
| Zinc | Acetate |
| | Arginate |
| | Amino Acid |
| | Ascorbate |
| | Aspartate |
| | Gluconate |
| | Glycinate |
| | Methionate |
| | Picolinate |
| | Sulfate |
| | Yeast |

What is claimed is:

1. A method of reducing hydrogen sulfide emission from asphalt or from the preparation of asphalt, the method comprising:
    adding a liquid scavenger composition to asphalt or asphalt mix,
    wherein the liquid scavenger composition comprises 5 wt % to 90 wt % of a metal chelate chosen from copper aspartate; copper gluconate; copper bis-glycinate; iron aspartate; iron glycinate; iron fumarate; iron gluconate; molybdenum chelate; molybdenum trit; zinc arginate; zinc ascorbate; zinc aspartate; zinc gluconate; zinc bis-glycinate; zinc methionate; zinc picolinate; and mixtures thereof; and a solvent having a flash point compatible with asphalt,
wherein the liquid scavenger composition is added to the asphalt or asphalt mix in an amount of 0.05 wt % to 5 wt %, based on total weight of the asphalt or asphalt mix, and is able to reduce hydrogen sulfide emissions from the asphalt or asphalt mix.

2. The method of claim 1, wherein the metal chelate is selected from the group consisting of copper bis-glycinate and zinc bis-glycinate.

3. The method of claim 1, wherein the asphalt or asphalt mix comprises an acid.

4. The method of claim 3, wherein the acid is selected from the group consisting of phosphoric acid and polyphosphoric acid.

5. The method of claim 3, wherein the acid is added to the asphalt or asphalt mix prior to addition of the liquid scavenger composition.

* * * * *